No. 828,813. PATENTED AUG. 14, 1906.
C. COLAHAN.
PROCESS FOR TREATING FLAX AND HEMP STRAW, &c.
APPLICATION FILED NOV. 17, 1905.
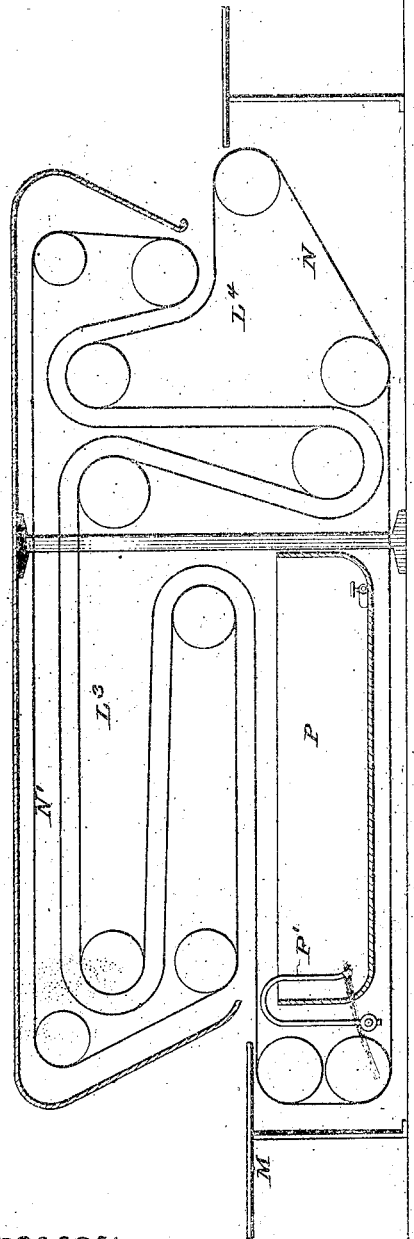
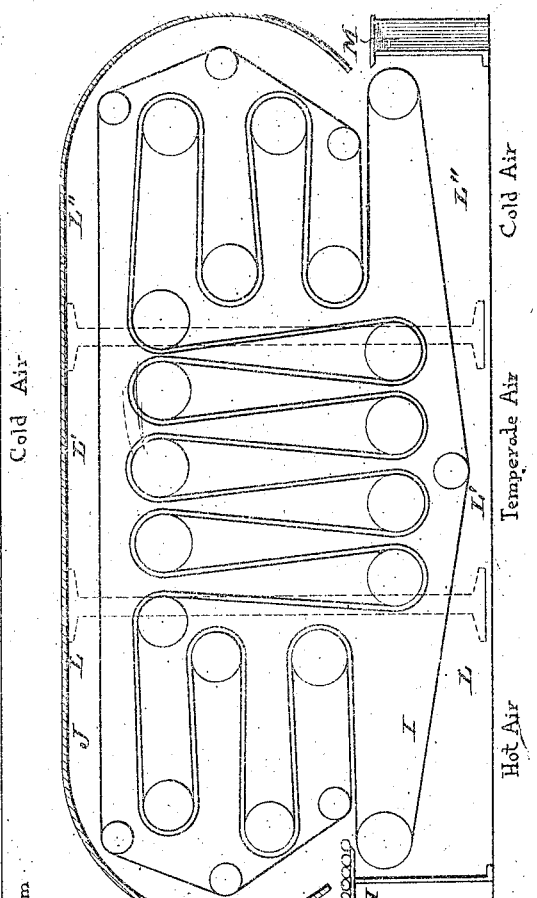
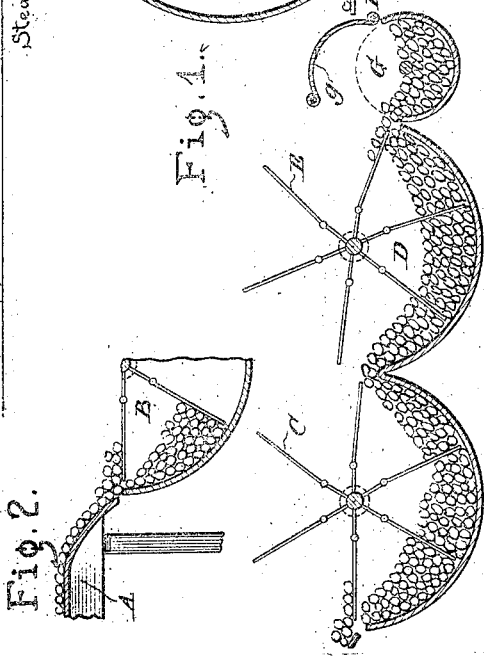
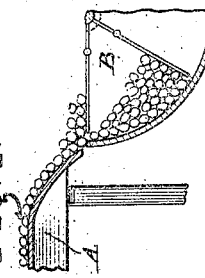
Witnesses:
M. H. Colahan
W. W. Hits
Inventor:
Chas Colahan

UNITED STATES PATENT OFFICE.

CHARLES COLAHAN, OF CHICAGO, ILLINOIS.

PROCESS FOR TREATING FLAX AND HEMP STRAW, &c.

No. 828,813.     Specification of Letters Patent.     Patented Aug. 14, 1906.

Application filed November 17, 1905. Serial No. 287,901.

*To all whom it may concern:*

Be it known that I, CHARLES COLAHAN, a citizen of the United States, and a resident of Chicago, in the county of Cook and State of Illinois, have invented certain new and useful Improvements in Processes for Treating Flax and Hemp Straw or Similar Fibers, of which the following is a specification, reference being had to the accompanying drawings, forming a part herewith.

My invention relates to the treatment of flax and hemp or similar fiber plants to obtain the fiber therefrom for commercial purposes.

The application of my invention is conducive to economical results and the production of a superior quality of fiber in a much shorter time than is usually required by other ways and at less expense, and the treatment can be regulated and controlled to different kinds or conditions of flax or hemp straw, which in many instances vary, as it may not be thoroughly and properly cured or seasoned in harvesting or injured by the exposure incident to field or water retting.

The invention consists in the treatment of the straw in a continuous manner, which treatment will decompose and make soluble to a certain extent the gummy substances binding the fibers together and facilitate the ready removal of the woody core by mechanical means.

In my process the straw, which is bound in bundles, is first subjected to the action of a solvent, preferably such as shown and described in Patent No. 806,954, dated December 12, 1905, through which it is moved by revolving rake-arms that force it into an adjoining tank containing rinsing-water. Revolving rake-arms again move the bundles continuously from the rinsing-tank into a rapidly-rotated perforated draining-receptacle, the centrifugal force of which causes the surplus moisture to be expelled from the bundles, which are maintained in a parallel position without in any way loosening or breaking the straw or fiber, which has become softened in the foregoing treatment, and is then delivered onto the receiving-table of the drying device, which is provided with continuously-traveling belts passing and conveying the bundles first into and through a heated air-chamber, thence through a moderately temperate air-chamber into a cold-air chamber. These chambers are separated by suitable partitions to maintain the desired temperature of each, which is important in the treatment of the fiber in order to preserve its natural strength and luster and secure its full length while under the action of the brake and scutcher; but with long fine fiber straw I find it desirable to subject the same to a further treatment to secure its proper condition for braking and scutching. This I do by passing the straw onward by means of continuous-moving belts through a steam-bath or vapor-chamber, thence continuously through a cold-air drying-chamber to soften and anneal the same and to absorb the surplus moisture, when it is ready for the brake. This will render the fiber supple, pliant, and strong for the final braking and cleaning process. I find by experience of many years and the practical operation of this treatment that more saitsfactory results are obtained in the production of a larger percentage of fiber of full length, with comparatively no tow or waste in the subsequent treatment of scutching, hackling, and spinning, while its tensile strength is much improved and superior to that made by any other known process.

The entire operation is rapid, and large quantities of straw can be thoroughly acted upon in a much shorter time and without manual labor, while all of the fiber is preserved in its best natural state, and there is no liability of any loss, and when scutched it will be found free from objectionable shives, and the seed-boll tips are entirely removed, which is an advantage not obtained by the old processes.

In the drawings, Figure 1 is a vertical sectional view of the solvent treating and drying device, Fig. 2 being a sectional view of the front or receiving end of the same. Fig. 3 is a vertical sectional view of the steam-bath and cold-air drying-chambers.

In the drawings, A represents the receiving-table, upon which the bundles of straw are laid; B, the solvent-tank, which is supplied with heat to the desired degree by any well-known means and provided with pivoted revolving rake-arms C, that control and move the bundles through the solvent in a period of about twenty minutes and discharge the same into the adjoining rinsing and washing tank D. This tank is also provided with similar pivoted rake-arms E, that receive the bundles as they enter the tank and pass them quickly through the rinsing-water into the rapidly-rotated perforated draining-receptacle G, provided with a receiving-door g, and in a few minutes the bundles are freed from the surplus water. They are then deposited over the receiving-table H directly onto the continuously-carrying belt I within the grasp of its coöperating carrying-belt J, and the straw is thus conveyed through the heated-air drying-chamber L and thence through a moderately temperate air-chamber L' and into the cold-air chamber L'', from which the straw is deposited on the intermediate table M, and the shorter coarser straw is ready for the brake or storage, while the longer finer straw, requiring further treatment to soften the epidermis, which may have been hardened or solidified in the drying treatment after retting, is passed, by means of continuously-moving carrier-belts N and N', through the adjoining vapor-chamber L, which is supplied with light vapor-steam arising from the water-tank P, that is warmed by the steam-pipe P'. In passing through this moist air the straw is annealed or tempered, so as to render it less brittle and bring the natural elements in the fiber into a balance, which constitutes the best spinning qualities, enabling the fiber to be drawn and spun to finer numbers. This condition is preserved by passing the straw therefrom immediately through the adjoining cold-air drying-chamber L⁴, that removes the surplus moisture, when it is ready for the brake and scutcher.

Having thus described my invention, what I claim, and desire to secure by Letters Patent, is—

1. The herein-described process for the treatment of hemp or flax, or other fiber, which consists in first subjecting the unbroken stalks to the action of a solvent, then removing the greater part of said solvent from the stalks, then drying said stalks in a series of chambers containing air at successively-decreasing temperatures, and thereafter braking the stalks.

2. The herein-described process for treatment of unbroken and unretted hemp and flax or like fiber plants which consists in first subjecting the unbroken stalks to the action of a solvent, then removing the greater part of said solvent by passing the stalks unbroken into the rinsing-tank D and thence delivering said stalks into a draining-receptacle and thereafter drying the stalks by exposing them to air at successively-decreasing temperatures substantially as set forth and described.

3. The herein-described process for the treatment of hemp and flax, or other fiber, which consists in first subjecting the unbroken stalks to the action of a solvent, then removing the greater part of said solvent from the stalks, then drying said stalks in a series of chambers containing air at successively-decreasing temperatures, then subjecting said stalks to the action of hot aqueous vapor, then to the action of a cold-air blast, and then braking and scutching said stalks.

4. The herein-described process of preparing unretted hemp and flax or like fiber plants for decortication, consisting in subjecting the unbroken stalks to a continuous movement through a heated solvent in an open tank, rinsing the stalks and then removing the moisture centrifugally, then drying said stalks in passage successively through a series of chambers supplied with air of varying temperature.

5. The herein-described process for the treatment of hemp and flax straw consisting in passing the unbroken stalks arranged in a parallel condition transversely through a heated-solvent tank, thence into a rinsing-tank, and into a draining-receptacle, then through a series of drying-chambers, said drying-chambers being supplied with air of varied degrees of temperature, regulated to the requirement of the stalks, and thereafter braking the stalks.

6. The herein-described process of treating fibrous plants consisting in continuously moving a mass of parallel flax or hemp stalks through a heated solvent, then removing the greater part of the solvent from the stalks and drying said stalks in a series of chambers of varying temperatures then braking and scutching said flax.

7. The herein-described process of annealing and tempering degummed fibrous plants which consists in subjecting the same first to the action of aqueous vapor by continuously moving said stalks through a steam-chamber to moisten and anneal said stalks, and thereafter subjecting them to the action of a cold-blast of air preparatory to braking and scutching.

8. The process of tempering and annealing degummed fibrous plants preparatory to braking and scutching, which consists in subjecting the same to a vapor-steam bath, and then to a cold-air draft, to absorb the surplus moisture, whereby the fiber is rendered supple, pliant and strong for the finishing processes of spinning, substantially as set forth and described.

CHARLES COLAHAN.

Witnesses:
M. H. COLAHAN,
C. O. DAILEY.